United States Patent [19]

Chiang

[11] Patent Number: 6,011,632
[45] Date of Patent: Jan. 4, 2000

[54] PLATFORM ARRANGEMENT OF A DESKTOP SCANNING DEVICE

[75] Inventor: Te-Ming Chiang, Taipei Hsien, Taiwan

[73] Assignee: Primax Electronics Ltd., Taipei, Taiwan

[21] Appl. No.: 08/984,648

[22] Filed: Dec. 3, 1997

[30] Foreign Application Priority Data

Oct. 23, 1997 [CN] China .................................. 86217955

[51] Int. Cl.$^7$ .............................. H04N 1/00; G03B 27/62

[52] U.S. Cl. .......................... 358/406; 358/401; 355/75; 399/379; 399/380

[58] Field of Search ..................................... 358/406, 474, 358/493, 496, 497, 400, 401, 449; 355/75, 76; 399/379, 380

[56] References Cited

U.S. PATENT DOCUMENTS 5,894,355  9/1997  Lin ........................................... 358/474

Primary Examiner—Kimberly A. Williams
Attorney, Agent, or Firm—Winston Hsu

[57] ABSTRACT

The present invention includes a casing for forming an upper housing of the desktop scanning device, a rectangular transparent plate for been placed thereon an object to be scanned, and a calibration strip on which light source from the desktop scanning device is projected as a calibration parameter. The calibration strip is mounted on the rectangular transparent plate so that either the upper housing or the surface of the transparent plate will not be damaged if the calibration strip has to replaced during the assembly of the scanning device. Furthermore, a darkened image generated by a gap existing between a background plate of an upper cover of the scanning device and the transparent plate can be prevented during scanning process.

2 Claims, 4 Drawing Sheets

PLATFORM ARRANGEMENT OF A DESKTOP SCANNING DEVICE

BACKGROUND OF THE INVENTION

1. Field of the Invention

The present invention relates to an improved structure of a desktop scanning device, and particularly, to an improved platform arrangement which can prevent the occurrence of a darkened image generated by a gap existing between an upper cover and a transparent plate located on the scanning device during the scanning process.

2. Description of the Prior Art

Referring to FIG. 1, it is a side view of a platform arrangement of a traditional flatbed scanner which illustrates an upper housing 10, a transparent plate 20, a calibration strip 30, an upper cover 40 and a background plate 50 (usually in white color). The calibration strip 30 is installed between the upper housing 10 and the transparent plate 20 shown in FIG. 1. The way the calibration strip 30 is installed will probably give rise to drawbacks as stated below.

First of all, during the assembly of the scanner, the white surface of the calibration strip 30 performed as the calibration parameter may be stained in some way, such as operator's fingerprints. The calibration performance may thus be reduced. The stained calibration strip 30 may not be easily removed and replaced by a clean one once the calibration strip 30, the upper housing 10 and the transparent plate 20 are bonded by glue, unless they are disassembled, respectively. However, the transparent plate 20 or the upper housing 10 may be spoiled during the disassembly.

Furthermore, the upper cover 40 of the flatbed scanner is usually equipped with a background plate 50 for providing a background color of the object to be scanned. Preferably, when the upper cover 40 is pulled down over the transparent plate 20 to start the scanning process, the transparent plate 20 can be completely covered by the background plate 50 without leaving any gap, so that a most complete background color can be provided without affecting the scanning performance. Nonetheless, owning that the upper cover 40 is a movable element, in actual operation of the flatbed scanner, a gap D (when the transparent plate 20 is not totally covered by the background plate 50, the gap D is a gap in width, while when the transparent plate 20 is totally covered by the background plate 50, i.e. the front end of the background plate 50 exceeds the point F, the gap D is a gap in height due to a bevel G shown in FIG. 1) may probably be created, and a darkened image data may be generated when the sensor (not shown) of the flatbed scanner detects the existence of the gap D during scanning process. The scanning performance may this be reduced. As illustrated in FIG. 2, if the gap D does exist, a darkened image 200 may be generated at both sides of the image 100 after the object is scanned.

SUMMARY OF THE INVENTION

It is therefore a primary object of the present invention to provide an improved platform arrangement of a desktop scanning device. The scanning device is equipped with a calibration strip which is installed on the transparent plate on which an object to be scanned is placed, so that either an upper housing or a transparent plate of the scanning device would not be damaged if the calibration strip has to be re-installed during the assembly of the scanning device. Furthermore, a darkened image generated by a gap existing between a background plate of the upper cover and the transparent plate can be prevented during the scanning process.

Briefly, the improved platform arrangement according to the present invention includes:

a casing for forming an upper housing of the desktop scanning device having a substantially rectangular platform including an external surface and an internal surface on which a rectangular concave area been provided, the rectangular concave area including a first lateral, a second lateral, a third lateral and a fourth lateral, respectively;

a rectangular transparent plate mounted on the internal surface of the rectangular platform and overlapped with the rectangular concave area for being placed thereon an object to be scanned; and a calibration strip on which light source from the desktop scanning device been projected as a calibration parameter, the calibration strip having a white surface mounted to the first lateral adjacent to the rectangular concave area.

In accordance with one aspect of the present invention, a plurality of indexes for measuring the dimension of the object are provided on the other surface opposite to the white surface of the calibration strip. Furthermore, either the second, third or fourth laterals is provided with a plurality of measuring indexes.

These and other objects and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 3:
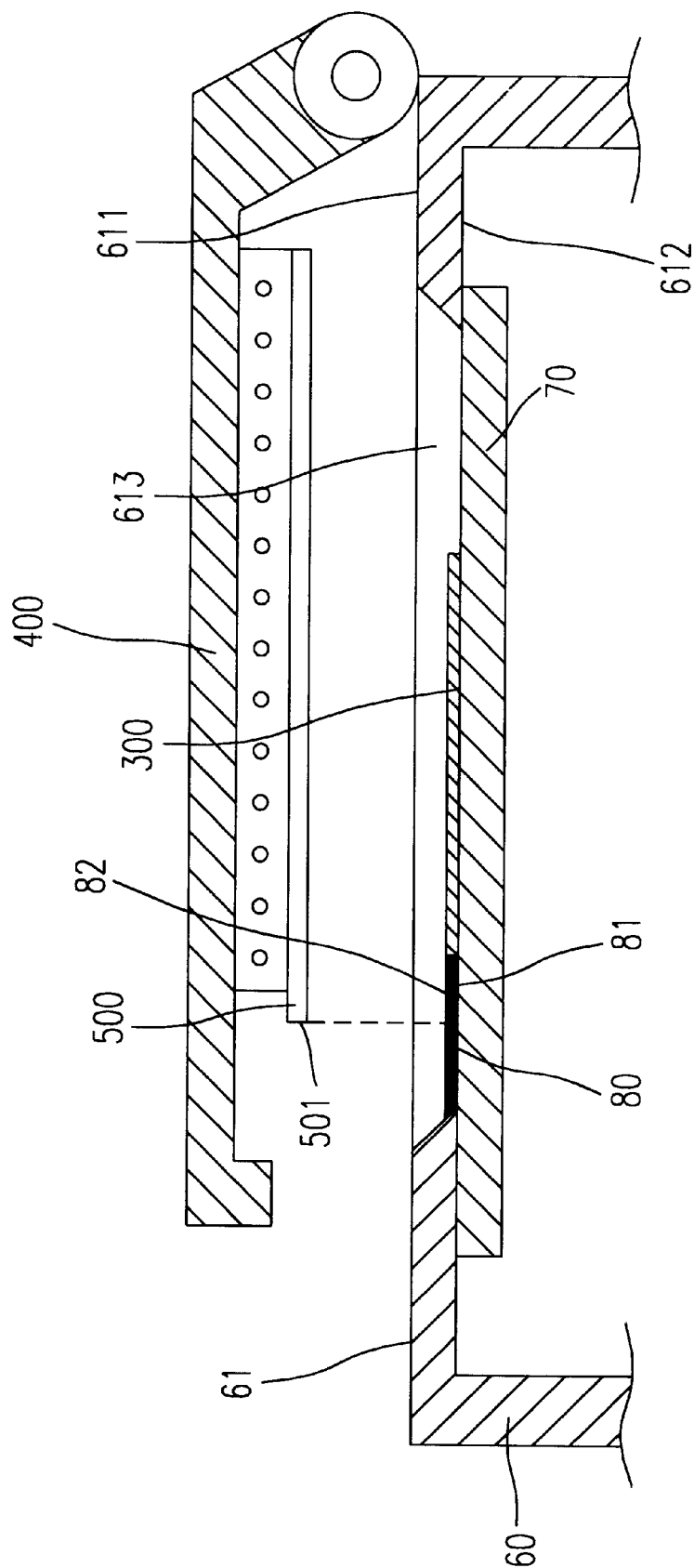
FIG. 3 is a side view of a preferred embodiment of an improved platform arrangement according to the present invention.
Figure 4:
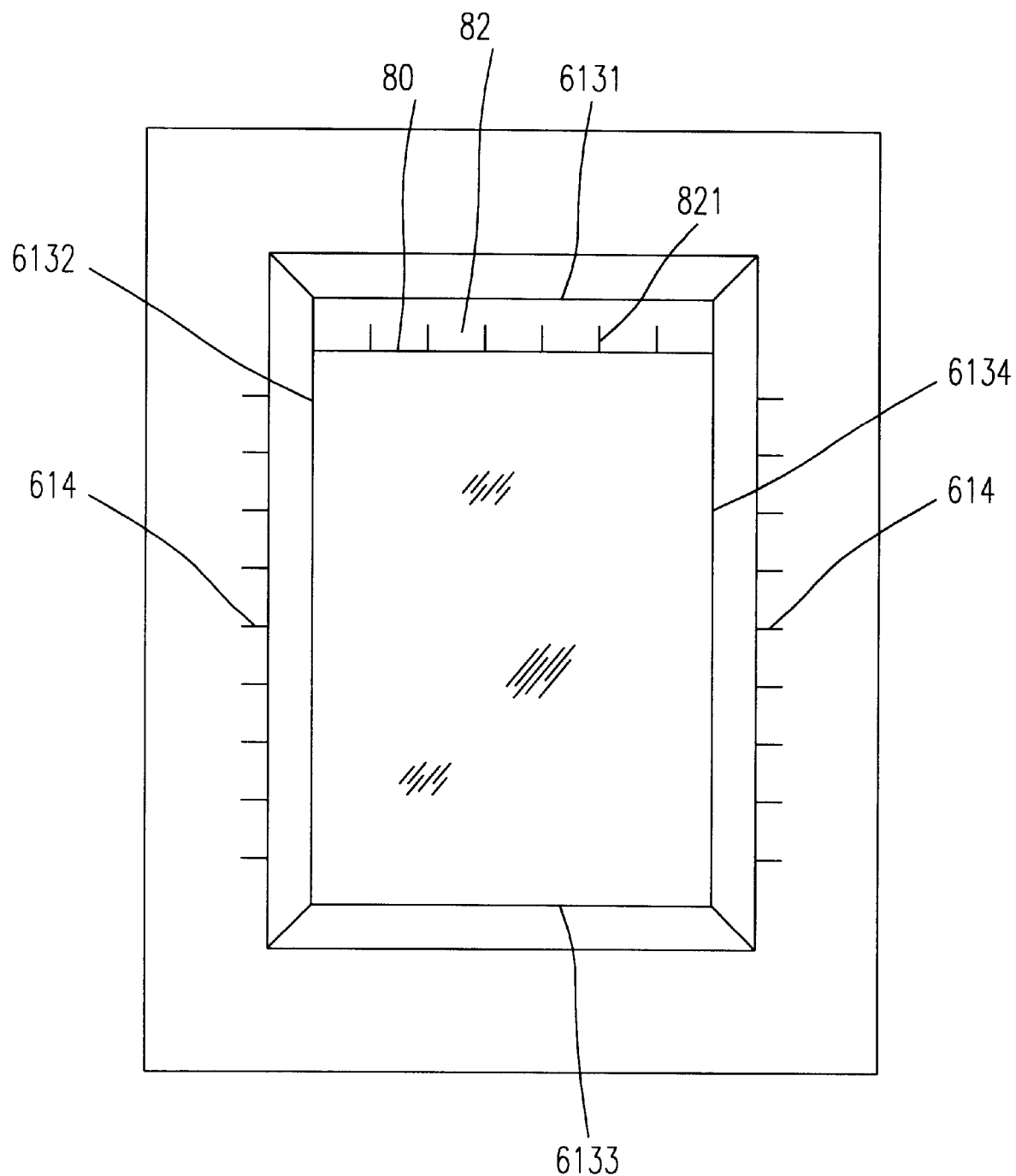
FIG. 4 is a top view of the preferred platform improvement according to the present invention.

The preferred platform improvement according to the present invention shown in FIGS. 3 and 4 includes a casing 60 for forming an upper housing of the desktop scanning device having a substantially rectangular platform 61 which includes an external surface 611 and an internal surface 612 on which a rectangular concave area 613 is provided. The rectangular concave area 613 includes a first lateral 6131, a second lateral 6132, a third lateral 6133 and a fourth lateral 6134, respectively. The scanning device further includes a rectangular transparent plate 70 which is mounted on the internal surface 612 and overlapped with the rectangular concave area 613 for being placed thereon an object to be scanned, and a calibration strip 80 on which light source from the scanning device is projected as a calibration parameter. The calibration strip 80 includes a white surface 81 mounted to the first lateral 6131 of the transparent plate 70 adjacent to the rectangular concave area 613 such that the calibration strip 80 is fixedly mounted on the transparent plate 70. Wherein a plurality of indexes 821 for measuring the dimension of the object are provided on the other surface 82 opposite to the white surface 81 of the calibration strip 80. Either the second, third or fourth laterals 6132, 6133 and 6134 is also provided with a plurality of measuring indexes 614.

Figure 1:
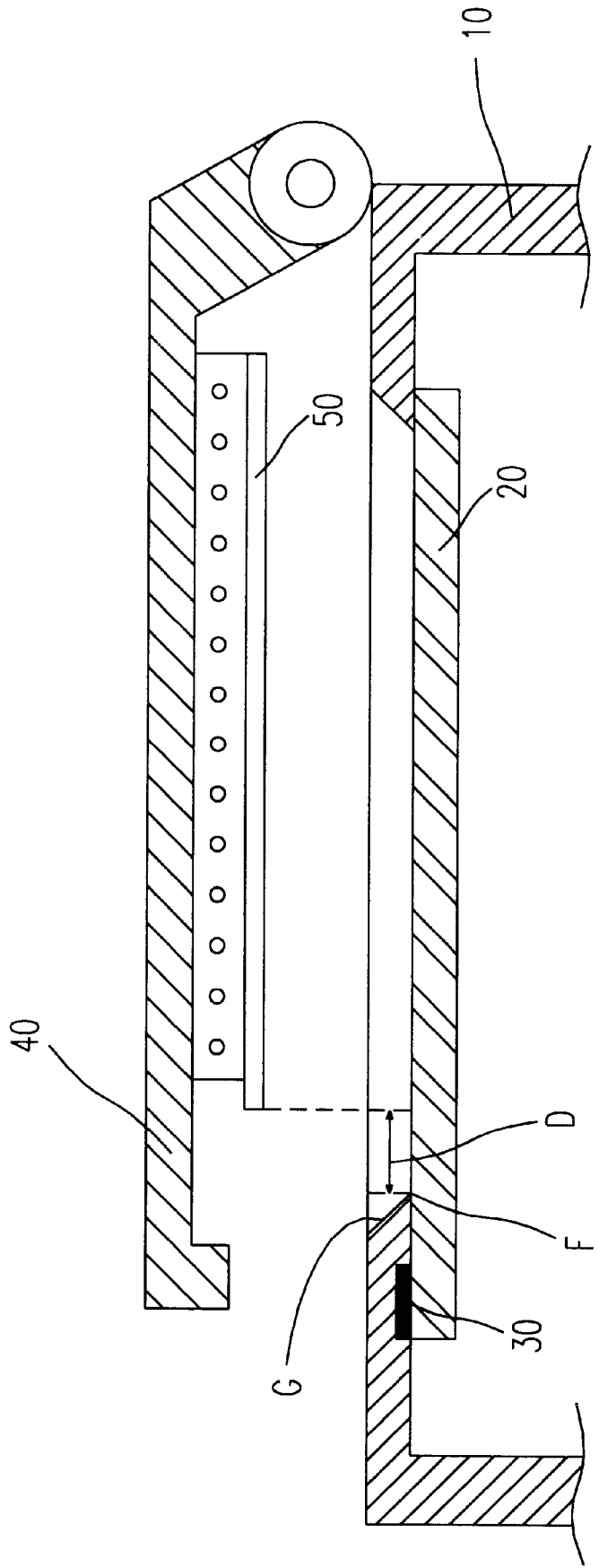
FIG. 1 illustrates a side view of a platform arrangement of a traditional flatbed scanner.
Figure 2:
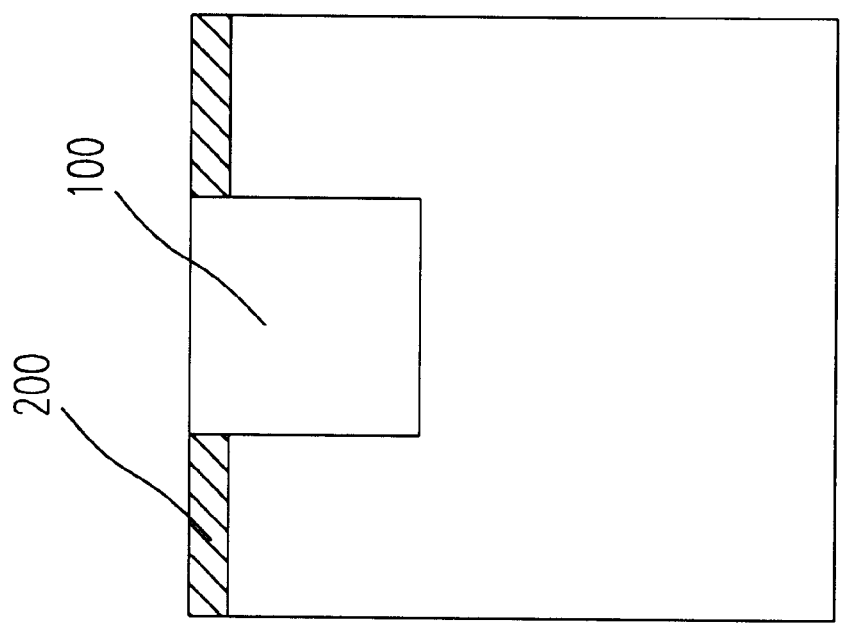
FIG. 2 illustrates a gap existing between a background plate and a transparent plate of the flatbed scanner show in FIG. 1.

Owning that the calibration strip 80 is mounted on the transparent plate 70, the transparent plate 70 can be totally covered by a background plate 500 of an upper cover 400 of the scanning device by increasing the dimension of the background plate 500. By doing so, the gap D shown in FIG. 1 can be eliminated therefrom.

Besides, the calibration strip 80 can be directly torn off the transparent plate 70 during assembly process without having to disassemble the tipper housing 60 and the transparent plate 70, if the calibration strip 80 needs to be replaced.

The above disclosure is not intended as limiting. Those skilled in the art will readily observe that numerous modifications and alterations of the system may be made while retaining the teachings of the invention. Accordingly the above disclosure should be construed as limited only by the metes and bounds of the appended claims.

What is claimed is:

1. A platform improvement of a desktop scanning device, comprising:

a casing for forming an upper housing of said desktop scanning device having a substantially rectangular platform including an external surface and an internal surface on which a rectangular concave area has been provided, said rectangular concave area including a first lateral, a second lateral, a third lateral and a fourth lateral, respectively;

a rectangular transparent plate mounted on said internal surface and overlapped with said rectangular concave area for being placed thereon an object to be scanned;

a calibration strip on which a light source from said desktop scanning device has been projected as a calibration parameter, said calibration strip having a white surface mounted to said first lateral adjacent to said rectangular concave area; and a plurality of indexes for measuring the dimension of said object to be scanned are provided on the other surface opposite to said white surface of said calibration strip.

2. The platform improvement of claim 1 wherein either said second, third or fourth laterals is provided with a plurality of measuring indexes.

* * * * *